July 27, 1926.
B. W. LINDQUIST
1,593,979
DRILL JIG
Filed June 30, 1921
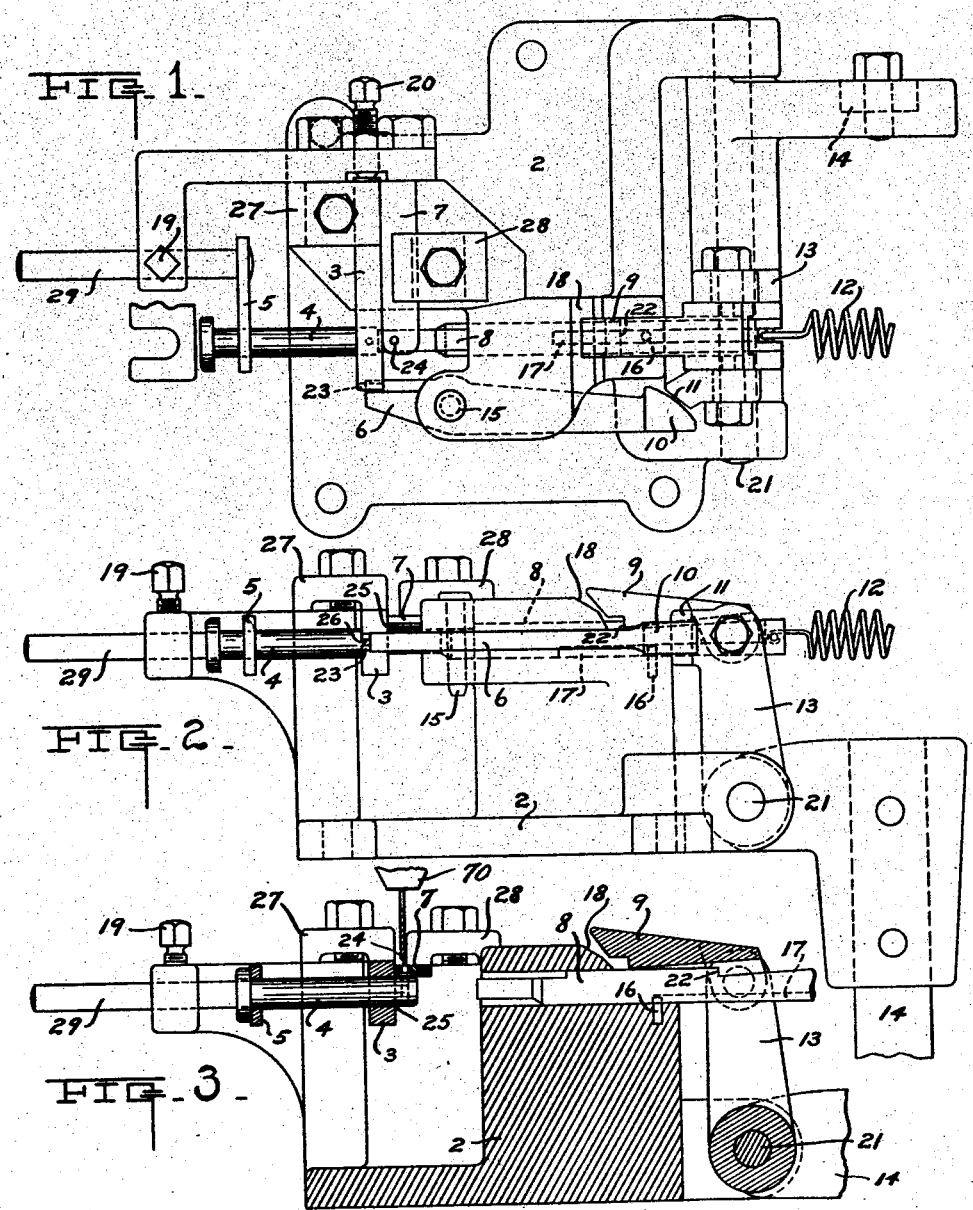
INVENTOR.
B. W. Lindquist
BY
W. H. Lieber
ATTORNEY.

Patented July 27, 1926.

1,593,979

UNITED STATES PATENT OFFICE.

BIRGER W. LINDQUIST, OF DETROIT, MICHIGAN, ASSIGNOR TO THE VIXSON COMPANY, OF DETROIT, MICHIGAN, A CORPORATION OF MICHIGAN.

DRILL JIG.

Application filed June 30, 1921. Serial No. 481,691.

This invention relates in general to improvements in the art of manufacturing similar objects in quantity, and relates more specifically to improvements in the construction and operation of jigs for holding objects while the same are being operated upon by a drill or other machine tool, and for subsequently performing a finishing operation upon the bodies.

An object of the invention is to provide a drill jig or similar device, which is simple in construction and efficient in operation. Another object of the invention is to provide improved means for holding successive objects while the same are being operated upon by a drill or other machine tool. A further object of the invention is to provide a jig member which is capable of performing a machining function upon objects held by the jig. Still another object of the invention is to provide improved means for enabling insertion and removal of objects into and from a jig. These and other objects and advantages of the present invention, and the manner in which they may be attained will be apparent from the following description.

A clear conception of an embodiment of the invention and of the operation of a device constructed in accordance therewith, may be had by referring to the drawing accompanying and forming a part of this specification, in which like reference character designate the same or similar parts in the various views.

Fig. 1 is a plan view of an improved drill jig adapted to hold clevis pins and similar objects while the same are having cotter pin holes drilled therethrough, and to subsequently remove the burrs left by the drill.

Fig. 2 is a side elevation of the improved drill jig.

Fig. 3 is a vertical section through the improved jig, showing the elements in a position different from that illustrated in the preceding figures.

Fig. 4 is a fragmentary vertical sectional view of the improved jig, the section being taken to the left of the holding and dressing member looking toward this member.

The drill jig illustrated in Figs. 1, 2 and 3 comprises in general a main frame or base 2, a combined gripping and shearing member 3, a drill guiding plate 7, a stock gage 5, a clevis pin ejecting plunger 8, and a spreading wedge 6. The base 2 is adapted for association with a drill or other machine tool in such a manner that the clevis pins 4 or other objects held by the jig, may be properly operated upon.

The combined object gripping and shearing member 3 illustrated in detail in Fig. 4, comprises a pair of spring arms or jaws which are separated by a recess 26 and each of which is provided at its end with an inclined spreading surface 23. The spring arms or jaws of the member 3 are provided with gripping surfaces shaped to hug the clevis pins 4 or other objects which the jaws are formed to grip. The edges 25 of the gripping jaws are formed as cutters adapted to shear burrs and other projections from the clevis pins 4 or other objects, when said objects are moved within and relatively to the jaws. The member 3 is firmly secured to the base 2 by means of a clamp 27 and may be adjusted so as to properly position the gripping surfaces, by means of a set screw 20 or with the aid of other adjusting means.

The drill guide plate 7 is secured to the base 2 laterally of the member 3, by means of a clamp 28. This guide plate 7 has a vertical drill guiding hole 24 therein which may be laterally adjusted to bring it into vertical alinement with the drill 70 and with the axis of the clevis pin 4. The position of the plate 7 and of the guide hole 24 therein, partially determines the location of the hole drilled in the clevis pin 4. The location of these holes is also determined by the position of the stock gage 5 which has a supporting rod 29 adjustably secured to an arm of the base 2 by means of an adjusting set screw 19. By moving the stock gage 5 nearer to the guide plate 7, the holes will be drilled nearer the heads of the clevis pins 4 and vice versa.

The clevis pin ejecting mechanism comprises an ejecting plunger 8 having a lower longitudinal recess 17 and an upper transverse shoulder 22, a latch 9 engageable with the shoulder 22 to move the plunger 8 forwardly, a helical tension spring 12 for retracting the plunger 8, a rocker arm 13 for operating the latch 9 and the spreading wedge 6, and manually manipulable mechanism 14 for oscillating the rocker arm 13.

The forward end of the plunger 8 is of reduced cross sectional area and is adapted to abut against the rear end of a clevis pin 4 held within the jaw member 3. The helical tension spring 12 is attached to the rear end of the plunger 8 and at all times tends to urge the plunger 8 rearwardly against a stop pin 16 secured to the base 2. The rocker arm 13 is pivotally associated with the main frame or base 2 by means of a transverse horizontal pivot pin 21. The latch 9 is pivotally connected to the upper extremity of the rocker arm 13 and has a forward inclined surface which is adapted to engage an inclined surface 18 on the main frame 2 in order to elevate the latch 9 out of engagement with the abutment or shoulder 22 of the plunger 8.

The upper side portion of the rocker arm 13 is provided with a laterally inclined surface 11 which is engageable with a cam 10 formed integral with the rear end of the jaw spreading wedge 6. The spreading wedge 6 is vertically pivotally associated with the main frame 2 by means of a pivot pin 15. The wedge 6 is adapted to engage the surfaces 23 of the object gripping jaws as shown in Fig. 4, in order to release an object or clevis pin 4 held by the member 3. The jig may also be provided with means for conducting cooling and lubricating fluid against the drill and clevis pins, such means having been omitted in order to clarify the disclosure.

During normal operation of the jig, and with the mechanism at rest, the guiding plate 7 and stock gage 5 should first be properly set to accommodate clevis pins 4 of a definite length. The several elements of the jig are positioned as illustrated in Fig. 3, with the plunger 8 fully retracted by the spring 12. The wedge 6 may then be brought into engagement with the surfaces 23 to spread the gripping jaws, by manually moving the rocker arm 13 forwardly and causing the rocker arm surface 11 to engage the wedge cam 10. When the gripping jaws of the member 3 have been thus spread, an undrilled clevis pin 4 may be freely inserted through the gage plate 5 and the member 3 and positioned as shown in Fig. 3. The wedge 6 may then be withdrawn from the surfaces 23 by releasing the rocker arm 13, such release permitting the spring jaws of the member 3 to firmly grip the intervening clevis pin 4 and to force the wedge 6 outwardly. The clevis pin 4 is then in position for drilling and the drill may be lowered through the opening 24 of the gage plate 7 which properly locates the cotter pin hole.

After a hole has been thus drilled, the drill is withdrawn and a burr is ordinarily left protruding from the clevis pin 4 adjacent to the newly drilled hole. In order to remove this burr, the rocker arm 13 is swung rearwardly until the latch 9 drops into engagement with the abutment or shoulder 22 of the plunger 8. With the latch 9 thus interlocking with the plunger shoulder 22, the rocker arm 13 is swung forwardly urging the plunger 8 forward and into direct engagement with the front end of the object or clevis pin 4. As the plunger 8 continues its forward travel, it pushes the object or clevis pin 4 axially and transversely of the cutting edges 25 of the gripping member 3, to the position shown in Figs. 1 and 2, thus causing the cutting edges 25 to shear off burrs which may have been produced during the drilling operation, and neatly dressing the clevis pin 4.

After the burrs have been thus removed, the forward movement of the rocker arm 13 is continued until the dressed clevis pin 4 is pushed completely out of the jaws of the gripping member 3, whereupon the clevis pin may be removed in any convenient manner. Simultaneously with this removal of the finished clevis pin 4, the latch 9 rides over the inclined surface 18 of the main frame or base 2, thus disengaging the latch 9 from the plunger shoulder 22 and permitting the spring 12 to become effective to automatically and quickly retract or withdraw the plunger 8. Simultaneously with this retraction of the plunger 8, the rocker arm surface 11 engages the cam 10 thus swinging the wedge 6 inwardly about its pivot pin 15 and into engagement with the inclined surfaces 23 of the gripping jaws. The gripping jaws are thus automatically spread and held open thereby permitting insertion of a fresh undrilled object or clevis pin 4. The cycle of operations may then be repeated and successive clevis pins 4 rapidly drilled and finished.

While the device has been shown as being especially adapted to hold and to remove burrs from clevis pins 4 after the same have been provided with cotter pin holes, it will be obvious that the principles of the invention are readily applicable to jigs for holding and for otherwise dressing objects of various shapes and sizes. The adjusting set screws 19, 20 permit variation in the location of the drilled holes and also permit drilling of clevis pins of various lengths. The jaw member 3 may be readily constructed from a rectangular bar of tool steel or similar material, and effectively serves the double function of initially holding and subsequently trimming the successive clevis pins 4.

It should be understood that it is not desired to limit the invention to the exact details of construction and of operation herein shown and described, for various modifications within the scope of the appended claims may occur to persons skilled in the art.

It is claimed and desired to secure by Letters Patent:—

1. A jig comprising an element having resilient bifurcations formed to grip an object and having cutting edges adjacent to their gripping portions, and means for moving the untrimmed portion of an object gripped by said jaws toward said cutting edges.

2. A jig comprising an element having opposed resilient bifurcations formed to laterally grip an object therebetween and having cutting edges adjacent to their gripping portions, and means for moving the burred portion of an object gripped between said jaws toward said cutting edges.

3. A jig comprising a pair of integral spring jaws formed to resiliently grip an object and having cutting edges adjacent to their gripping portions, and means for moving the untrimmed portion of an object gripped by said jaws toward said cutting edges.

4. A jig comprising an element having resilient bifurcations provided with recesses forming an enlarged opening between said bifurcations, said bifurcations having cutting edges adjacent to said recesses and being biased toward each other, and means for moving an object disposed within said opening and gripped by said bifurcations toward said cutting edges.

5. A jig comprising a pair of jaws formed to resiliently grip and to simultaneously trim an object, and means for spreading said jaws.

6. A jig comprising a pair of integral jaws formed to simultaneously grip and trim an object, and means for spreading said jaws.

7. A jig comprising a pair of jaws formed to resiliently transversely grip an object, means for removing said object by urging the same laterally between said jaws, and means on said jaws for cutting said object during said removal.

8. A jig comprising a pair of resilient jaws for transversely gripping an elongated object, means for removing said object by moving the same longitudinally between said jaws, and means on said jaws for trimming said object during said removal.

9. A jig comprising a pair of resilient jaws adapted to laterally grip an elongated object, said jaws having cutting edges coactable with an object gripped therebetween, and means for removing a gripped object longitudinally from between said jaws whereby said edges cut said object.

10. A jig comprising a pair of integral jaws forming a gripping and shearing element, means for moving an object gripped by said element whereby said object is sheared, and means for subsequently spreading said jaws to release the grip upon said object.

11. A jig comprising a pair of connected resilient gripping jaws adapted to cut an object moved therebetween, and means insertible directly between said jaws to release said object.

12. A jig comprising a pair of integral resilient jaws adapted to laterally grip an object and to hold the same in proper relation to a machine tool, and a plunger for moving said object relatively to said jaws whereby said object is trimmed.

13. A jig comprising a pair of rigidly united gripping jaws for holding an object in proper relation to a machine tool, a plunger for moving said object while held between said jaws, and means for spreading said jaws to release said object.

14. A jig comprising an element having integral spring jaws adapted to hold an object, a plunger for moving said object while held by said jaws, and a wedge insertable between said jaws to release said object.

15. A jig comprising a pair of spring jaws adapted to laterally grip an elongated object, said jaws having cutting edges coacting with an object gripped therebetween, means for moving a gripped object transversely within said jaws whereby said edges cut said object, and means for spreading said jaws to release said object.

16. A jig comprising an element having integral spring jaws adapted to laterally grip an object, a plunger for moving an object gripped by said jaws transversely thereof, means on said jaws for cutting an object thus moved, and means for separating said jaws to release said object.

17. A jig comprising an element having integral spring jaws adapted to laterally grip an object, a plunger for moving an object gripped by said jaws transversely thereof, said jaws having cutting edges adapted to trim an object thus moved, and a wedge insertable between said jaws for releasing said object.

18. A jig comprising an element having integral spring jaws adapted to laterally grip a cylindrical object, means for machining an object gripped by said jaws, means for subsequently moving said object within said jaws to perform a finishing function upon said object, and means for subsequently spreading said jaws to release the finished object.

19. A jig comprising an element having integral spring jaws adapted to laterally grip a cylindrical object, means for drilling a hole through an object held by said jaws, means for subsequently moving said object within said jaws to remove the burr produced during drilling, and a wedge insertable between said jaws to release said object.

In testimony whereof, the signature of the inventor is affixed hereto.

BIRGER W. LINDQUIST.